United States Patent
Gourlay et al.

(10) Patent No.: US 9,729,578 B2
(45) Date of Patent: Aug. 8, 2017

(54) METHOD AND SYSTEM FOR IMPLEMENTING A NETWORK POLICY USING A VXLAN NETWORK IDENTIFIER

(71) Applicant: Arista Networks, Inc., Santa Clara, CA (US)

(72) Inventors: Douglas Alan Gourlay, San Francisco, CA (US); Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 177 days.

(21) Appl. No.: 14/592,932

(22) Filed: Jan. 9, 2015

(65) Prior Publication Data

US 2015/0200847 A1 Jul. 16, 2015

Related U.S. Application Data

(60) Provisional application No. 61/925,910, filed on Jan. 10, 2014.

(51) Int. Cl.
| | | |
|---|---|---|
| *H04L 29/06* | (2006.01) | |
| *H04L 12/24* | (2006.01) | |
| *H04L 12/927* | (2013.01) | |
| *H04L 12/721* | (2013.01) | |
| *H04L 12/741* | (2013.01) | |

(Continued)

(52) U.S. Cl.
CPC .......... *H04L 63/20* (2013.01); *H04L 41/0816* (2013.01); *H04L 41/0893* (2013.01); *H04L 45/72* (2013.01); *H04L 45/74* (2013.01); *H04L 47/20* (2013.01); *H04L 47/80* (2013.01); *H04L 49/354* (2013.01); *H04L 49/70* (2013.01); *H04L 63/0876* (2013.01); *H04L 63/10* (2013.01); *H04L 63/123* (2013.01)

(58) Field of Classification Search
CPC ..... H04L 49/70; H04L 41/0816; H04L 47/80; H04L 45/72; H04L 45/74; H04L 49/354; H04L 63/10; H04L 63/123; H04L 12/4641; H04L 12/4679
See application file for complete search history.

(56) References Cited

U.S. PATENT DOCUMENTS

2014/0123211 A1* 5/2014 Wanser .................. H04L 63/10 726/1
2014/0337497 A1* 11/2014 Wanser ............... H04L 41/0866 709/223

(Continued)

OTHER PUBLICATIONS

Mahalingam, M. et al., "Virtual Extensible Local Area Network (VXLAN): A Framework for Overlaying Virtualized Layer 2 Networks over Layer 3 Networks", retrieved at http://tools.ietf.org/html/rfc7348, Aug. 2014 (22 pages).

*Primary Examiner* — Benjamin H Elliott, IV
(74) *Attorney, Agent, or Firm* — Chamberlain Hrdlicka

(57) ABSTRACT

A method and system for applying a network policy in a virtual extensible local area network (VXLAN) environment. The method includes receiving, at a network device, a VXLAN frame that includes a source VXLAN network identifier (VNI). The network device includes a first network policy. The method also includes examining the VXLAN frame to determine the source VNI; obtaining, based on the source VNI, the first network policy; and processing the VXLAN frame based on the application of the first network policy.

20 Claims, 8 Drawing Sheets

(51) Int. Cl.
*H04L 12/931* (2013.01)
*H04L 12/813* (2013.01)

(56) References Cited

U.S. PATENT DOCUMENTS

2014/0369345 A1* 12/2014 Yang .................. H04L 12/18
   370/355
2015/0200847 A1* 7/2015 Gourlay ................ H04L 49/70
   370/392

* cited by examiner

METHOD AND SYSTEM FOR IMPLEMENTING A NETWORK POLICY USING A VXLAN NETWORK IDENTIFIER

CROSS-REFERENCE TO RELATED APPLICATIONS

This application claims benefit under 35 U.S.C. §119(e) to U.S. Provisional Patent Application Ser. No. 61/925,910, filed on Jan. 10, 2014 and entitled, "METHODS AND SYSTEMS FOR NETWORK VIRTUALIZATION." U.S. Provisional Patent Application Ser. No. 61/925,910 is incorporated herein by reference in its entirety.

BACKGROUND

Computer networks typically facilitate communication between multiple computing devices that are operatively connected to one another via one or more network devices. Computing devices often send data to and receive data from other computing devices via the computer network.

SUMMARY

In general, in one aspect, the invention relates to a method for applying a network policy in a virtual extensible local area network (VXLAN) environment. The method includes receiving, at a network device, a VXLAN frame that includes a source VXLAN network identifier (VNI). The network device includes a first network policy. The method also includes examining the VXLAN frame to determine the source VNI; obtaining, based on the source VNI, the first network policy; and processing the VXLAN frame based on the application of the first network policy.

In general, in one aspect, the invention relates to a method for applying a network policy in a virtual extensible local area network (VXLAN) environment. The method includes receiving, at a network device, a VXLAN frame that includes a media access control (MAC) address associated with a destination computing device. The network device includes a first network policy. The method also includes examining the VXLAN frame to determine the MAC address of the destination computing device; determining, based on the MAC address of the destination computing device, a destination VNI of the VXLAN frame; obtaining, based on the destination VNI, the first network policy of the network device; and processing the VXLAN frame based on the application of the first network policy.

In general, in one aspect, the invention relates to a system for applying a network policy in a virtual extensible local area network (VXLAN) environment. The system includes a computing device configured to generate and receive media access control (MAC) frames and operatively connected to a network device; and the network device, which includes a network policy and a VXLAN tunnel end-point (VTEP). The network device includes functionality to receive a first VXLAN frame that includes a first source VXLAN network identifier (VNI). The network device includes a first network policy. The network device also includes functionality to examine the first VXLAN frame to determine the first source VNI, obtain, based on the first source VNI, the first network policy, and process the first VXLAN frame based on the application of the first network policy.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to the application of one or more network policies in a virtual extensible local area network (VXLAN) environment. More specifically, embodiments of the invention relate to the use of VXLAN network identifiers (VNIs) by network devices to obtain one or more network policies apply when processing a MAC frame and/or VXLAN frame. When a VXLAN frame arrives at a network device, or a MAC frame is encapsulated by a VTEP of a network device to obtain a VXLAN frame, the VXLAN frame may be examined to determine a source VNI. In the event that the VXLAN frame is to be routed to a different VNI, the network device may use information included in a received or obtained VXLAN frame, or received MAC frame, to determine a destination VNI. Source VNI, destination VNI, and/or a combination thereof may be used to obtain one or more network policies to be applied, at least in part, in order to process the MAC frame and/or VXLAN frame.

In one or more embodiments of the invention, network policy application methods use, at least in part, the VXLAN protocol. One version of the VXLAN protocol is defined in the document entitled "VXLAN: A Framework for Overlaying Virtualized Layer 2 Networks over Layer 3 Networks" version 08 dated Feb. 3, 2014. The VXLAN protocol is hereby incorporated by reference in its entirety. The invention is not limited to a particular version of VXLAN.

Figure 2:
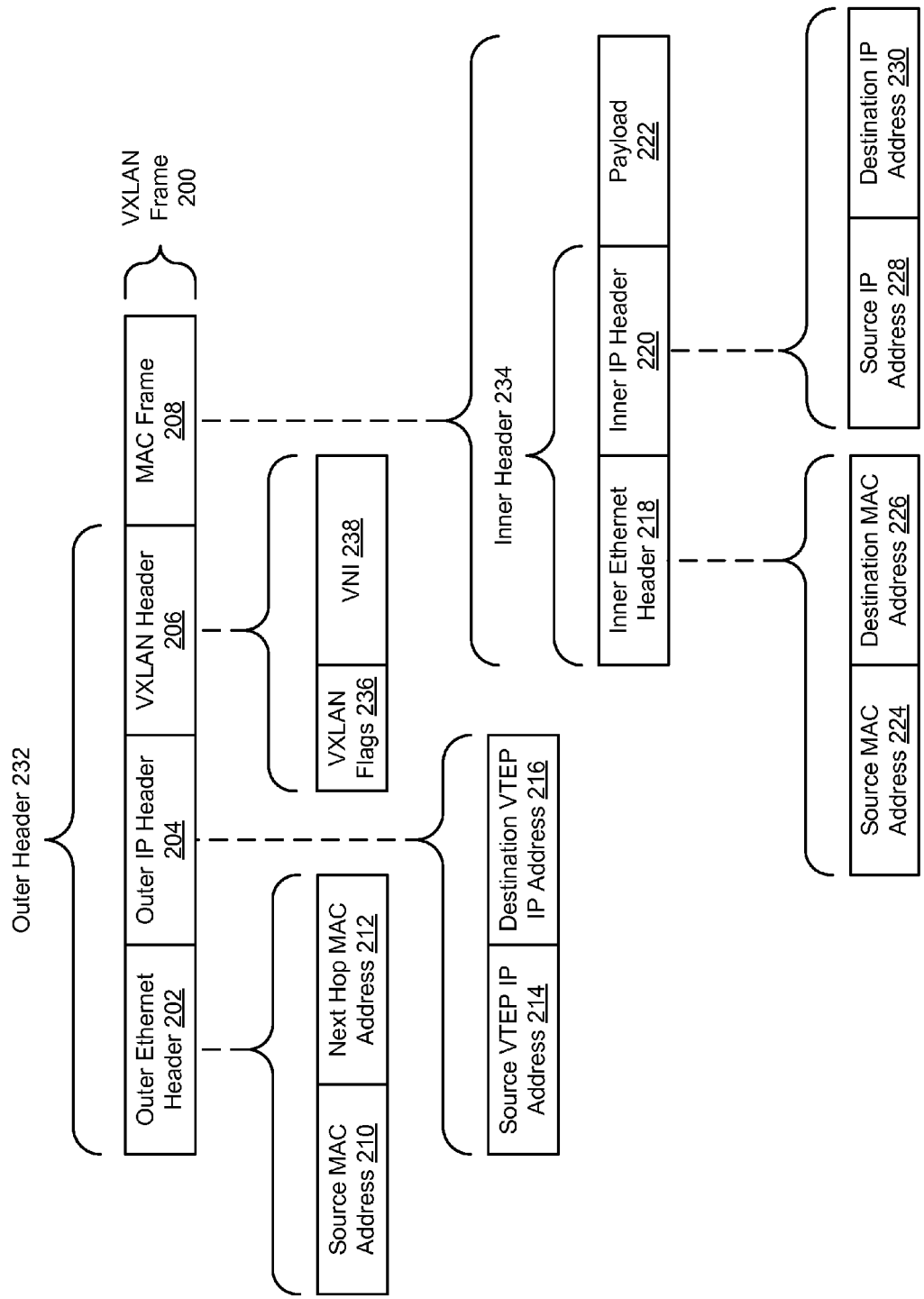
FIG. 2 shows a VXLAN frame in accordance with one or more embodiments of the invention.

In one or more embodiments of the invention, a VXLAN layer 2 domain (i.e., a VXLAN segment) is defined as the set of computing devices (e.g., virtual machines, servers, etc.) that communicate using the same VNI, where the VNI is defined by the VXLAN protocol (see e.g., FIG. 2). The VNI identifies the scope of the MAC frame originated by the computing device such that the MAC frame may only be sent to destination computing devices associated with the same VNI. The MAC frame may be sent to a computing device associated with a different VNI if the MAC frame is routed into a new VXLAN L2 domain.

Figure 1:
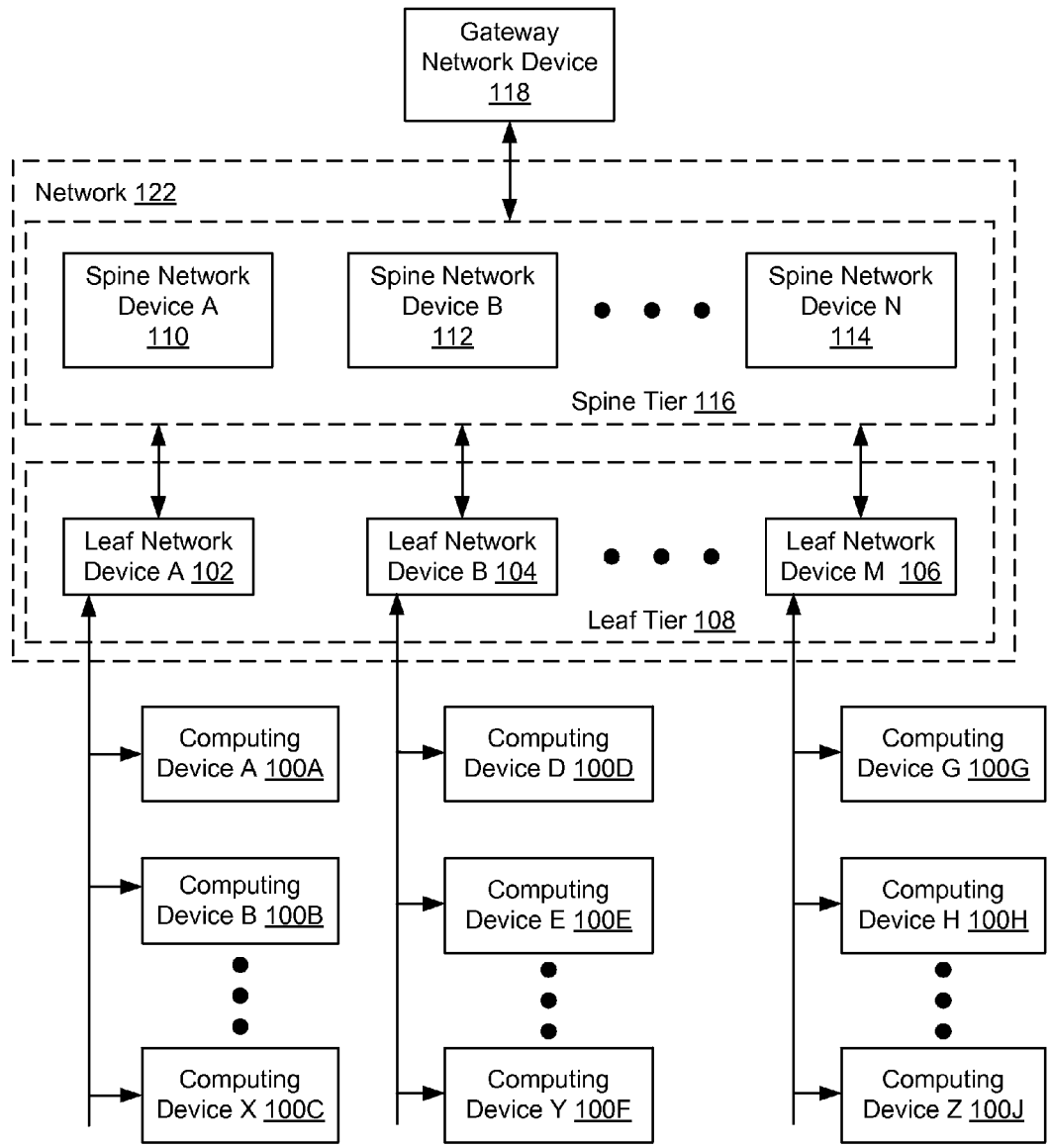
FIG. 1 shows a network topology in accordance with one or more embodiments of the invention.

FIG. 1 shows a network topology in accordance with one or more embodiments of the invention. In one or more embodiments of the invention, the network topology includes a leaf tier (108) and a spine tier (116). The leaf tier and the spine tier may be collectively referred to as the network (122), which may be all of or a portion of a computer network. The leaf tier (108) may include leaf network devices (102-106). Leaf network devices in the leaf tier (108) may be operatively connected to one or more computing devices (100A-100J), as well as operatively connected to one or more network devices in the spine tier (116). The spine tier may include spine network devices (110-114). Spine network devices in the spine tier (116) may also be operatively connected to one or more gateway network devices (e.g., gateway network device (118)). All of the aforementioned components may be co-located in the same physical location. Alternatively, the aforementioned components may not all be co-located. Additional details regarding each of the aforementioned components are provided below.

In one or more embodiments of the invention, a computing device (100A-100J) is any device (or set of devices) capable of electronically processing instructions and that includes at least the minimum processing power, memory, input and output device(s), ability to generate and/or receive MAC frames, and network connectivity to perform, at least in part, one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, or other mobile device), network attached storage (NAS) devices or any other type of computing device with the aforementioned minimum requirements.

In one or more embodiments of the invention, one or more computing devices (100A-100J) are servers. A server may include any type of system (e.g., software and computer hardware) that is configured to generate, send, receive, and/or process requests and replies either locally or over a network using software and computer hardware. The server may include one or more processors, memory, and one or more physical network interfaces. Examples of types of servers include, but are not limited to, VM hosts (i.e., physical servers configured to host one or more VMs), database servers, dynamic host configuration protocol (DHCP) servers, application servers, file servers, print servers, and mail servers.

In one or more embodiments of the invention, one or more of the computing devices are VM hosts. A VM host includes functionality to host one or more VMs (not shown). A VM is a software based emulation of a computing device. A VM may be assigned all or a portion of the various hardware included in the physical computing device that is serving as the VM host. Hosting a VM includes, but is not limited to, providing the VM the hardware resources assigned to the VM, scheduling time for the VM to use various physical hardware resources (e.g., a processor, network resources, etc.), and translating instructions from the VM into instructions that are understood by the underlying physical hardware, operating system, and/or hypervisor of the VM host. In one or more embodiments of the invention, a VM host includes a hypervisor (not shown). A hypervisor (i.e., virtual machine monitor) is computer software that includes the ability to create, execute, and/or, at least in part, manage VMs executing on a VM host. In other embodiments of the invention, the VM host includes an operating system on which a VM executes.

In one or more embodiments of the invention, a VM includes functionality to generate and/or receive MAC frames. A VM host on which a VM executes that is assigned to a particular VXLAN segment identified by a VNI may include a VXLAN tunnel end-point (VTEP) (not shown). A VTEP is an entity (e.g., software) which originates and/or terminates VXLAN tunnels and may be capable of: (i) encapsulating a MAC frame generated by a computing device (e.g., a VM) to obtain a VXLAN frame; and (ii) receiving a VXLAN frame destined for an operatively connected destination computing device (e.g., a VM) and decapsulating the MAC frame therein before delivering the MAC frame to the destination computing device (e.g., the VM). MAC frames and VXLAN frames are discussed further in the description of FIG. 2, below.

In one or more embodiments of the invention, each computing device (100A-100J) is operatively connected to one or more leaf network devices (102-106) of the leaf tier (108) of the network (122). In one or more embodiments of the invention, a network (122) is a collection of one or more network devices that facilitate network connectivity for one or more computing devices. In one or more embodiments of the invention, the network (122) may be all or a portion of a computer network. A computer network may include a datacenter network, a wide area network, a local area network, a wireless network, a cellular phone network, or any other suitable network that facilitates the exchange of information from one part of the network to another, or any combination thereof. In one or more embodiments, the network (122) is coupled to or overlaps with the Internet.

In one or more embodiments of the invention, leaf network devices (102-106) of a leaf network tier (108) are switches. The leaf network devices (102-106) may provide connectivity between one or more of the computing devices (100A-100J) and the rest of a network (122), including other computing devices attached to the network. A switch is a physical device that includes persistent storage, memory (e.g., Random Access Memory), one or more processors, and two or more physical ports (i.e., interfaces). Each port may or may not be connected to another device on a network (e.g., a laptop, a server, a switch, a router, etc.). A switch may be configured to receive frames (e.g., MAC frames and/or VXLAN frames) via the ports and determine whether to (i)

drop the frame, (ii) process the frame in accordance with one or more embodiments of the invention (e.g., in accordance with the one or more network policies of the switch), and/or (iii) send the frame, based on the processing, out of another port on the switch. How the switch makes the determination of whether to drop the frame or send the frame to another device on the network depends, in part, on whether the switch is a layer-2 (L2) switch or a layer-3 (L3) switch (also referred to as a multi-layer switch), which may perform at least some functions of a router. If the switch is operating as a L2 switch, the switch uses a destination MAC address along with a forwarding table to determine out of which port to send the frame. If the switch is operating as a L3 switch, the switch uses a destination IP address along with a routing table to determine out of which port to send the frame. If the switch is a multi-layer switch, the multi-layer switch includes functionality to process frames using both MAC addresses and IP addresses.

In one or more embodiments of the invention, the leaf network devices (102-106) function as routers. A router is a network device that is operatively connected to two or more computer networks and includes functionality to communicate packets (e.g., IP packets encapsulated in MAC frames) between the networks and/or between L2 domains. A router, similar to the L3 switch described above, uses the destination IP address, which may be included in a MAC frame and/or in a VXLAN frame, and a routing table to determine a route to the destination computing device. A router may include functionality to determine the MAC address of the next-hop device along that route, which is written by the router as the destination MAC address of a rewritten MAC frame and/or VXLAN frame. The router may then send the frame out of an interface operatively connected to the next-hop device.

In one or more embodiments of the invention, the leaf network devices (102-106) include functionality to facilitate, at least in part, the participation of one or more operatively connected computing devices to in one or more VXLAN segments and thus include functionality to receive, process, generate, and/or obtain VXLAN frames. In one or more embodiments of the invention, the leaf network devices (102-106) include a VTEP (not shown). In one or more embodiments of the invention, each VTEP includes, at least, functionality to encapsulate received MAC frames in order to obtain VXLAN frames to send in accordance with the VXLAN protocol, as well as to process received VXLAN frames in accordance with the VXLAN protocol. Each VTEP may be implemented as a combination of software and storage (volatile and/or persistent storage). Alternatively, each VTEP may be implemented as a combination of hardware and storage (volatile and/or persistent storage). In another alternative, each VTEP may be implemented as a combination of hardware and software.

In one or more embodiments of the invention, a leaf network device (102-106) is configured to make a determination about whether to drop the frame, process the frame, and/or send the frame to another device on the network by applying one or more network policies (not shown). In one or more embodiments of the invention, the leaf network device (102-106) includes one or more network policies. A network policy is a set of rules or conditions, implemented by network device hardware and/or software, that allows a network device to determine how to process a MAC frame and/or VXLAN frame received at an interface of the network device, and/or how to process a MAC frame and/or VXLAN frame that is to be sent from an interface of the network device. For example, a MAC frame and/or VXLAN frame may be dropped, transmitted out of an interface of the network device, broadcast or multicast to devices on a network, transmitted to a quarantine for analysis, replicated, etc. Examples of network policies include, but are not limited to, firewalls that allow or deny frames based on VNI, access control lists (ACLs), policies that ensure a desired quality of network service provided for information sent from or destined for a given computing device or group of computing devices connected to a network (i.e., a quality-of-service (QoS) policy), and policies that "shape" packet traffic (also referred to as "traffic shaping") by, for example, delaying transmission of a portion of the packets to ensure that the bandwidth through an interface of the network device does not exceed a defined threshold.

In one or more embodiments of the invention, each leaf network device (102-106) is also operatively connected to one or more spine network devices (110-114) of the spine tier (116) of the network (122). A spine network device may be a switch, router, and/or multi-layer switch with functionality substantially similar to that described with reference to leaf network devices, above. Spine network devices (110-114) may include one or more network policies substantially similar to the network policies that may be included on a leaf network device. In one or more embodiments of the invention, one or more of the spine network devices (110-114) include functionality to facilitate the participation of one or more operatively connected computing devices in one or more VXLAN segments. In one or more embodiments of the invention, a VTEP (not shown) executes on the spine network device, with functionality similar to that described above in reference to a VTEP executing on a leaf network device.

In one or more embodiments of the invention, each spine network device (110-114) is operatively connected to one or more gateway network devices (118) (e.g., an edge router). A gateway network device (118) may be a router, and/or a switch with routing capabilities, that provides connectivity between the network (122) and other portions of a computer network, other networks, and/or the Internet. Gateway network devices may include one or more network policies substantially similar to the network policies that may be included on a leaf network device and/or spine network device. In one or more embodiments of the invention, one or more of the gateway network devices (118) include functionality to facilitate the participation of one or more operatively connected computing devices in one or more VXLAN segments. In such embodiments, a VTEP (not shown) executes on the gateway network device, with functionality similar to that described above in reference to a VTEP executing on a leaf network device.

Although the network of FIG. 1 shows three leaf network devices, two spine network devices, and one gateway network device arranged in a three-tier hierarchy, the quantity of each of these system components may vary based on the particular requirements of a given implementation of the invention. For example, there may be a greater or fewer number of leaf network devices, a greater or fewer number of spine network devices, and a greater or fewer number of gateway network devices. Furthermore, there may be more or less tiers in the hierarchy of the network. For example, while a leaf tier leaf network device generally connects to computing devices, and gateway devices generally connect to devices outside the network (e.g., the Internet), there may be more than one spine tier present in the network in order to meet the requirements of the network and/or invention.

The invention is not limited to the system configuration shown in FIG. 1.

FIG. 2 shows a VXLAN frame in accordance with one or more embodiments of the invention. The VXLAN frame (200) includes, at least: (i) a MAC frame (208), (ii) a VXLAN header (206), (iii) an outer IP header (204), and (iv) an outer Ethernet header (202). Each of the aforementioned components is described below.

In one or more embodiments of the invention, the MAC frame (208) is generated by a source computing device (e.g., a VM, a server, etc.) and may include an inner header (234) and a payload (222). The payload (222) may include the content that the computing device is attempting to transmit to the destination computing device. The inner header (234) includes an inner Ethernet header (218) and an inner IP header (220). The inner Ethernet header (218) includes a source MAC address (224), and a destination MAC address (226). The inner IP header (220) includes a source IP address (228) and a destination IP address (230). The MAC frame may include other information/content without departing from the invention.

In one or more embodiments of the invention, the VXLAN header (206) includes, but is not limited to, a VXLAN network identifier (VNI) (238) and one or more VXLAN flags (236). The VNI (238) identifies the scope of the MAC frame (208) originated by the computing device such that the MAC frame (208) may only be received by destination computing devices associated (via a VTEP) with the same VNI, unless the MAC frame is to be routed to a different VNI, in which case the VNI may be either a source VNI or a destination VNI, depending on whether a MAC frame has already been routed from one VNI to another VNI. VXLAN flags may be an eight bit field in which an "I" flag is set to one to indicate a valid VNI while the remaining seven bits are set to zero on transmit and ignored on receive. The VXLAN header may include other information and/or content without departing from the invention.

In one or more embodiments of the invention, the outer Ethernet header (202) and the outer IP header (204) are used to route the VXLAN frame from the source VTEP to the destination VTEP. To this end, the outer Ethernet header (202) includes the source MAC address (210) and the next hop MAC address (212) and the outer IP header (204) includes the source VTEP IP address (214) and the destination VTEP IP address (216). The aforementioned components may include other information/content without departing from the invention. The outer Ethernet header (202), the Outer IP header (204), and the VXLAN header (206) may be collectively referred to as an outer header (232).

The VXLAN frame may include other components without departing from the invention.

Figure 3:
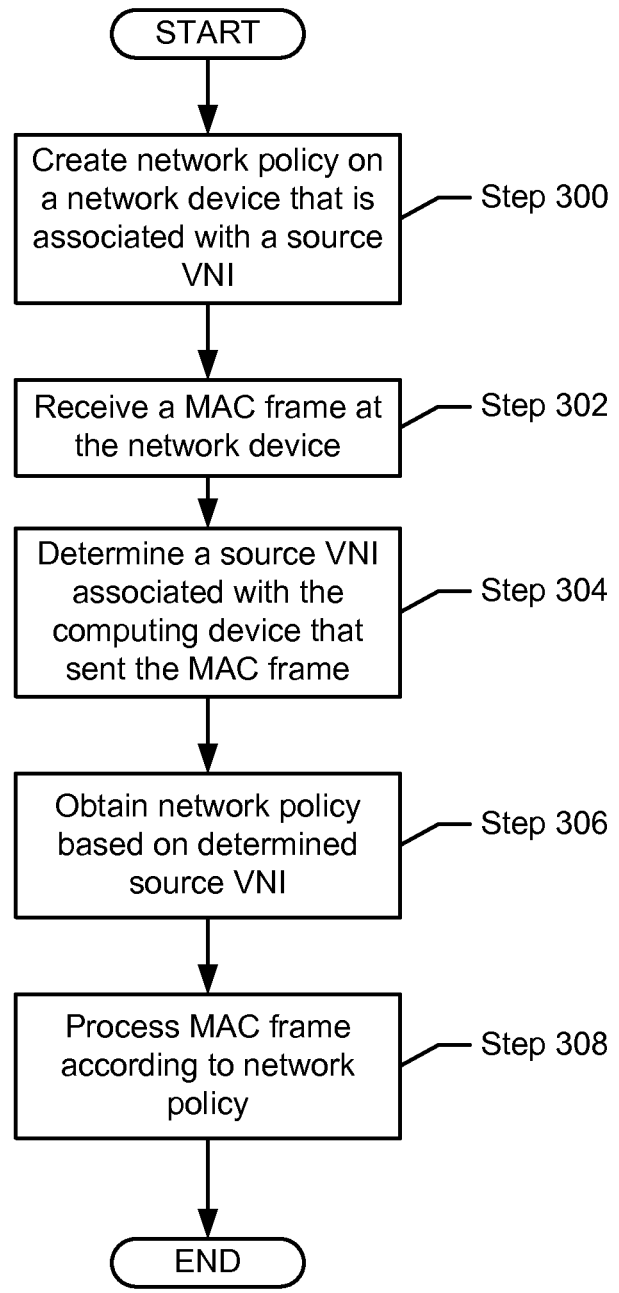
FIG. 3 shows a method for applying a network policy based on a source VNI in accordance with one or more embodiments of the invention.
Figure 4:
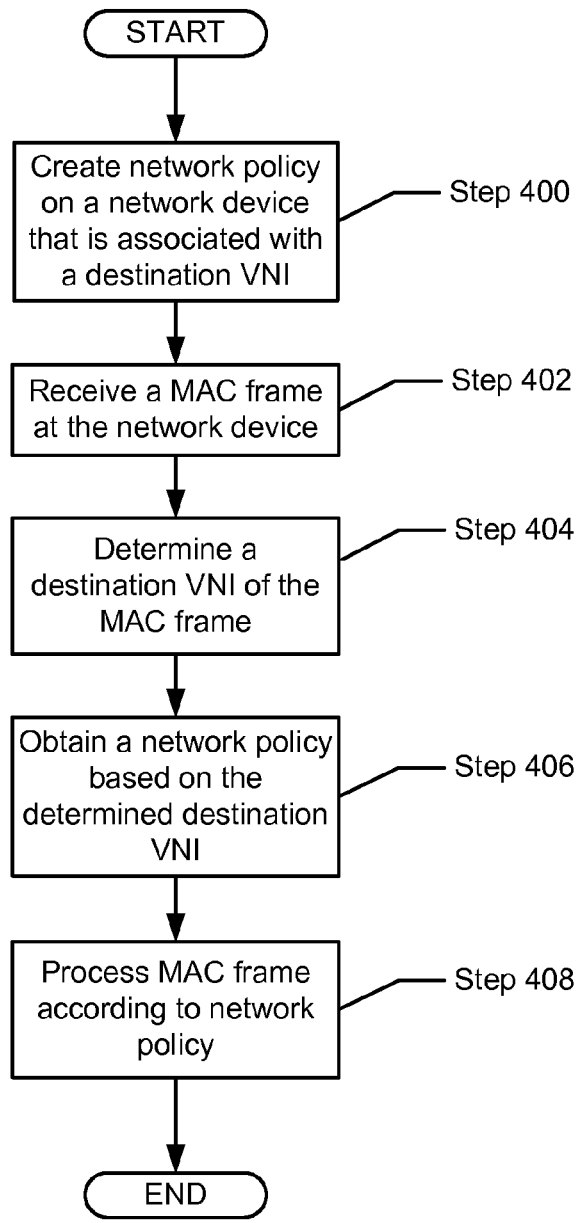
FIG. 4 shows a method for applying a network policy based on a destination VNI in accordance with one or more embodiments of the invention.
Figure 5:
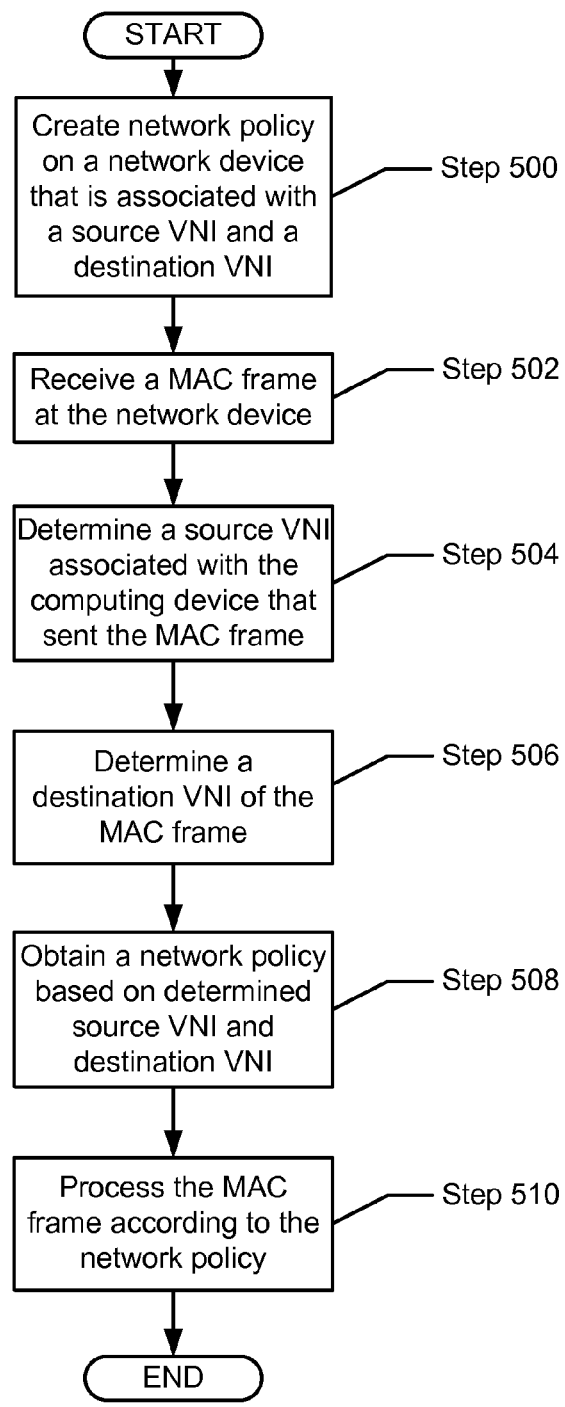
FIG. 5 shows a method for applying a network policy based on a source VNI and a destination VNI in accordance with one or more embodiments of the invention.

FIGS. 3, 4, and 5 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3, 4, and/or 5 may be performed in parallel with any other steps shown in FIGS. 3, 4, and/or 5 without departing from the invention. Furthermore, the determination steps may be active steps or passive steps. An active determination step may be one in which an entity performs an action, such as a processor executing an instruction, or a value being compared/tested. A passive determination step may be a point in the process where the flow of the process merely splits based on the existence, or lack thereof, a given condition.

Turning to FIG. 3, FIG. 3 shows a method for applying a network policy based on a source VNI in accordance with one or more embodiments of the invention. In Step 300, a network policy is implemented (e.g., configured by a network administrator) on a network device and associated with a VNI. Implementation of a network policy may include defining one or more rules that will be evaluated and applied to VXLAN frames and/or MAC frames originating from computing devices assigned to the specified VNI. For example, an ACL may be created for use with all computing devices assigned to VNI 27 (e.g., the source VNI), in which case all VXLAN frames received by the network device from VMs and all MAC frames received by the network device from non-VM computing devices will have the ACL rules applied if the sending computing device is determined to be assigned to VNI 27. In one or more embodiments of the invention, the network policy is stored and/or implemented in the software of the network device, the hardware of a network device, or a combination thereof.

In Step 302, a MAC frame is received at an interface of the network device. In one or more embodiments of the invention, receiving a MAC frame at an interface of a network device includes detecting an electronic signal arriving at an interface that communicates the bits included in a MAC frame to the network device. In one or more embodiments of the invention, receiving a MAC frame includes receiving a MAC frame that is encapsulated in a VXLAN frame. In one or more embodiments of the invention, receiving a MAC frame includes receiving a MAC frame that is not encapsulated in a VXLAN frame.

In Step 304, a source VNI associated with the computing device from which the MAC frame originated is determined. In embodiments of the invention in which the MAC frame arrives at an interface of the network device encapsulated in a VXLAN frame, determining a source VNI includes examining the VXLAN header of the VXLAN frame in order to determine the VNI included therein. In one or more embodiments of the invention, when a MAC frame arrives at a network device, the network device includes functionality to examine the received MAC frame to determine the source computing device and, based on information included in the MAC frame (e.g., source IP address, source MAC address, etc), to determine the source VNI with which the source computing device is associated. In one or more embodiments of the invention, the network device that receives a MAC frame includes a VTEP, and the network device, via the VTEP, includes functionality to encapsulate a MAC frame to obtain a VXLAN frame. In such embodiments of the invention, the network device may include functionality to determine the VNI prior to encapsulating the MAC frame. For example, the MAC frame may include a virtual local area network (VLAN) tag that is mapped to a specific VNI. Such mappings may be stored on and/or accessible to the network device.

In Step 306, one or more network policies are obtained based on the determined source VNI. In one or more embodiments of the invention, the source VNI discovered in Step 304 is used to obtain one or more network policies on the network device to be applied to MAC frames originating from computing devices assigned to the determined source VNI. In one or more embodiments of the invention, obtaining a network policy may include preparing the network device to evaluate and/or apply the one or more network policies associated with a VNI in the event that a MAC frame arrives at an interface of the network device that originates from the VNI, in order to determine how to process the MAC frame.

In Step 308, the MAC frame is processed according to the network policy obtained in Step 306. Processing the MAC frame may include applying one or more rules included in one or more network policies associated with the source VNI to determine what action(s) should be taken regarding a MAC frame originating from a computing device associated with the source VNI.

Turning to FIG. 4, FIG. 4 shows a method for applying a network policy based on a destination VNI in accordance with one or more embodiments of the invention. In Step 400, a network policy is implemented on a network device and associated with a VNI. Creation of a network policy may include defining one or more rules that will be evaluated and applied to MAC frames whose destination computing device is assigned to the VNI. For example, an ACL may be configured for use in processing all MAC frames destined for computing devices associated with VNI 63. In one or more embodiments of the invention, the network policy is stored and/or implemented in the software of the network device, the hardware of a network device, or a combination thereof.

In Step 402, a MAC frame is received at the network device. Receipt of a MAC frame may include receiving one or more signals at an interface of the network device that communicate the contents of the MAC frame to the network device. In one or more embodiments of the invention, the MAC frame arrives at the network device encapsulated in a VXLAN frame. In other embodiments of the invention, the MAC frame arrives at the network device without being encapsulated in a VXLAN frame.

In Step 404, the destination VNI of the MAC frame is determined. In one or more embodiments of the invention, determining the destination VNI includes first determining the destination of the MAC frame. In one or more embodiments of the invention, the network device receives a MAC frame that is not encapsulated in a VXLAN frame. In such embodiments of the invention, the destination IP address of the MAC frame and/or the destination MAC address of the MAC frame may be used to determine the destination VNI of the MAC frame, which may be the VNI associated with the source computing device that originated the MAC frame or may be a different VNI associated with the destination computing device. Information associating VNIs with identifying information of computing devices may be stored in a location accessible by the network device. The network device may include functionality to examine the stored associative information to determine the destination VNI when a destination computing device has been identified using information from a received MAC frame (e.g., destination IP address, destination MAC address).

In one or more embodiments of the invention, the network device receives a MAC frame that is encapsulated in a VXLAN frame. In such embodiments of the invention in which the destination computing device of the MAC frame is associated with a different VNI (e.g., the destination VNI) than the VNI associated with the source computing device (e.g., the source VNI), the network device includes functionality to route the MAC frame encapsulated in a received VXLAN frame to the new L2 domain associated with the destination VNI. In such embodiments of the invention, the network device includes a VTEP which decapsulates the received VXLAN frame to obtain the MAC frame therein. The destination IP address of the obtained MAC frame may be used, along with a routing table stored on and/or available to the network device, to perform a routing function to obtain a destination MAC address associated with the destination computing device. The obtained destination MAC address may be used by the network device to obtain a rewritten MAC frame, which is encapsulated by the VTEP into a new VXLAN frame. In one or more embodiments of the invention, the new VXLAN frame includes the destination VNI associated with the destination computing device.

In Step 406, one or more network policies are obtained based on the determined destination VNI. In one or more embodiments of the invention, the destination VNI discovered in Step 404 is used to obtain one or more network policies on the network device to be applied to MAC frames destined for the determined destination VNI. In one or more embodiments of the invention, obtaining a network policy may include preparing the network device to evaluate the one or more network policies associated with a VNI in the event that a MAC frame arrives at an interface of the network device that is destined for the VNI, in order to determine how to process the MAC frame.

In Step 408, the MAC frame is processed according to the one or more network policies associated with the destination VNI. Processing the MAC frame may include evaluating one or more rules included in one or more network policies to determine what actions should be taken regarding a MAC frame destined for a computing device associated with the destination VNI with which the network policy is associated. For example, a network device may have an ACL that has one rule and is associated with destination VNI 89. When a MAC frame is determined to be destined for a computing device designated to participate in the VXLAN segment identified by VNI 89 arrives at the network device, and the destination VNI is determined, then the network device uses the VNI to obtain the ACL, and then evaluates the rule therein in order to process the MAC frame. If, for example, the rule is that MAC frames destined for a computing device assigned to VNI 89 may not originate from any IP address with the first two octets of "10" (e.g., 10.10.27.54), then, upon receipt of a MAC frame that includes a source IP address of 10.10.123.231 and whose destination IP is determined to correspond to a computing device of VNI 89, the network device will process the MAC frame by dropping the MAC frame in accordance with the ACL rule. If, of the other hand, a MAC frame arrives at an interface of the network device destined for VNI 89 with a source IP address in the MAC frame of 72.159.54.163, then the network device, after evaluating the network policy, will send the MAC frame from the appropriate interface towards the destination computing device of the MAC frame.

Turning to FIG. 5, FIG. 5 shows a method for applying a network policy based on both the source VNI and the destination VNI of a MAC frame in accordance with one or more embodiments of the invention. In Step 500, a network policy is implemented on a network device that is associated with both a source VNI and a destination VNI of a MAC frame. Implementation of a network policy may include defining one or more rules that will be evaluated and applied to MAC frames and/or VXLAN frames that have a source VNI and a destination VNI that match the two VNIs associated with the network policy. For example, an ACL may be configured for use in processing all MAC frames destined for computing devices associated with VNI 54 and originating from computing devices associated with VNI 7 that pass through a network device on which the ACL is configured. In one or more embodiments of the invention, the network policy is stored and/or implemented in the software of the network device, the hardware of a network device, or a combination thereof.

In Step 502, a MAC frame is received at the network device. Receipt of a MAC frame in Step 502 is substantially similar to receipt of a MAC frame described above in Step 302 of FIG. 3 and in Step 402 of FIG. 4.

In Step 504, a source VNI associated with the computing device from which the MAC frame originated is determined. Determination of the source VNI in Step 504 is substantially similar to the source VNI determination described above in Step 304 of FIG. 3.

In Step 506, the destination VNI is determined. The destination VNI is determined in a manner substantially similar to the destination VNI determination described above in Step 404 of FIG. 4.

In Step 508, one or more network policies are obtained based on the determined source VNI and destination VNI. In one or more embodiments of the invention, the source VNI discovered in Step 504 and the destination VNI discovered in Step 506 are used to obtain one or more network policies on the network device to be applied to MAC frames that originate from the determined source VNI and are destined for the determined destination VNI. In one or more embodiments of the invention, obtaining a network policy may include preparing the network device to evaluate the one or more network policies associated with a source VNI and a destination VNI in the event that a MAC frame arrives at an interface of the network device that originates from the source VNI and is destined for the destination VNI, in order to determine how to process the MAC frame.

In Step 510, the MAC frame is processed according to the one or more network policies associated with the source VNI and destination VNI. Processing the MAC frame may include evaluating one or more rules included in one or more network policies to determine what actions should be taken regarding a MAC frame originating from the source VNI and destined for the destination VNI with which the network policy is associated. For example, a network device may have a quality-of-service (QoS) policy that is associated with VNI 43 as a source VNI and VNI 32 as a destination VNI. When a received MAC frame is determined to have originated from VNI 43 and be destined for a computing device designated to participate in the VXLAN segment identified by VNI 32, then the network device uses the VNI combination to obtain the QoS policy, and then evaluates the policy in order to process the MAC frame. Continuing the example, the QoS policy may indicate that MAC frames that originate from VNI 43 and are destined for VNI 32 should be high priority if the source IP address of the MAC frame begins with "21.15" (e.g., 21.15.123.156). If a MAC frame arrives at the network device with an IP address of 21.15.10.7, then the network device takes appropriate action to give higher priority to processing and sending the MAC frame relative to other data received at the network device. If, on the other hand, a MAC frame that originates from VNI 43 and is destined from VNI 32, and the source IP address of the MAC frame is determined to be 35.26.54.98, then the network device will not give the MAC frame a high priority.

Figure 6:
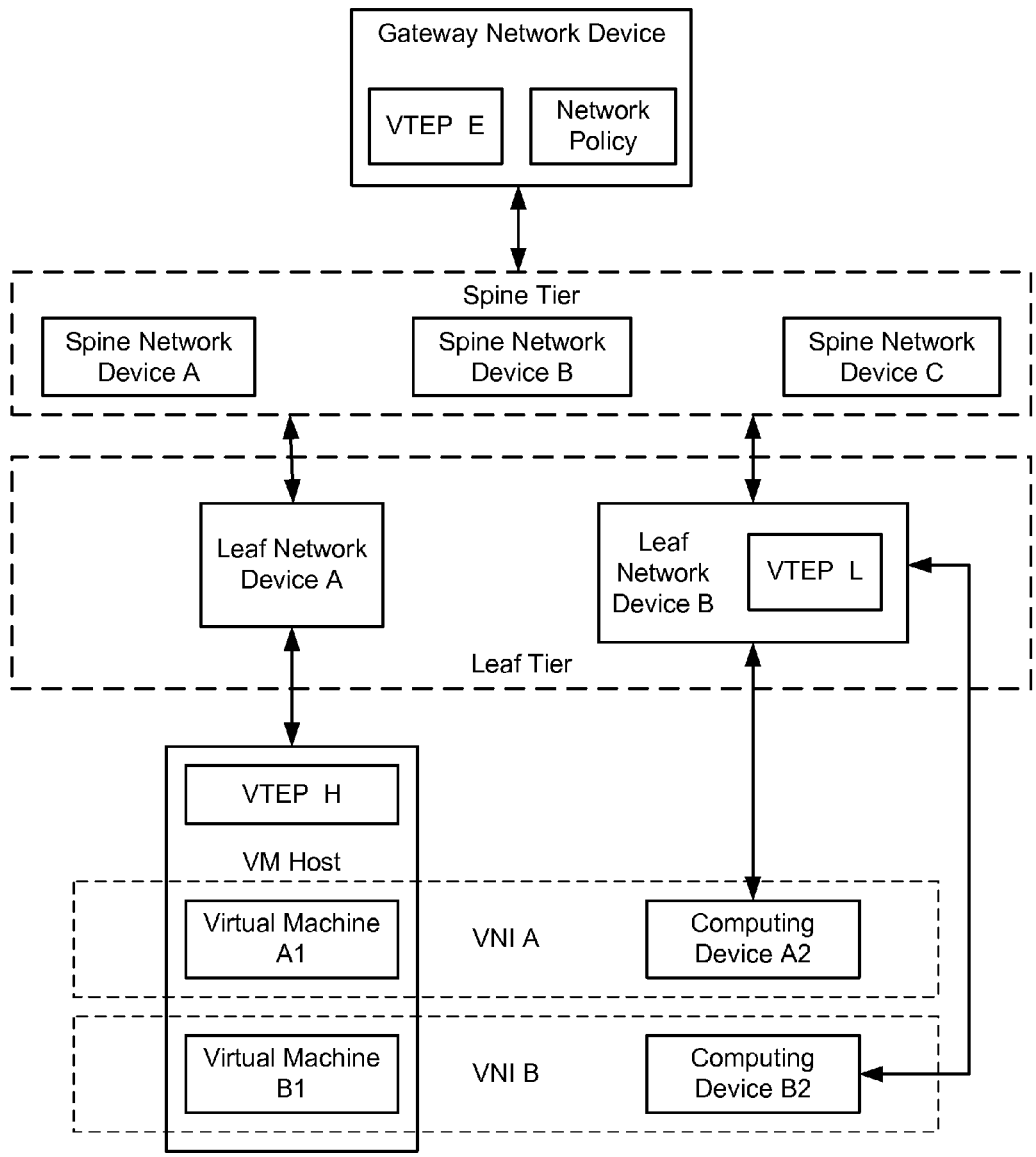
FIG. 6 shows an example of applying a network policy based on a source VNI in accordance with one or more embodiments of the invention.

FIG. 6 shows an example in accordance with one or more embodiments of the invention. The example is not intended to limit the scope of the invention.

Referring to FIG. 6, consider a scenario in which a network includes a gateway network device on which VTEP E executes and on which a network policy is configured. The network policy is associated with VNI A and includes rules indicating that no network traffic originating from VNI A is to leave the network and that network traffic originating from any other VNI is allowed leave the network. The gateway network device is operatively connected to spine network device A, spine network device B, and spine network device C in a spine tier. Each spine network device is an L3 switch capable of using IP addresses and/or MAC addresses to process MAC frames and/or VXLAN frames. Each spine network device is operatively connected to leaf network device A and leaf network device B in a leaf tier. Leaf network device A is operatively connected to a VM host. VTEP H executes on the VM host, which hosts virtual machine A1 and virtual machine B1. VTEP L executes on leaf network device B. Leaf network device B is operatively connected to computing device A2 and computing device B2. Virtual machine A1 of the VM host and computing device A2 are assigned to VNI A, which is a VNI that identifies VXLAN segment A. Virtual machine B1 of the VM host and computing device B2 are assigned to VNI B, which is a VNI that identifies VXLAN segment B. VXLAN segment A includes only computing devices meant to exist in an internal-only lab network of a company. VXLAN segment B includes only computing devices used by marketing department employees of the company.

In the aforementioned scenario, virtual machine A1 generates a MAC frame that encapsulates a packet that includes data to be transmitted to a destination computing device on the Internet. The MAC frame includes the data payload, a source IP address (e.g., the IP address of virtual machine A1), and a destination IP address (e.g., the IP address of a destination computing device). The MAC frame also includes a source MAC address (e.g., the MAC address of virtual machine A1), and a destination MAC address. The destination MAC address may be, for example, the MAC address of the destination computing device, if known to virtual machine A1, or may be the MAC address of a network device that knows a route to the destination computing device (e.g., a default gateway).

The MAC frame is then provided to VTEP H. VTEP H encapsulates the MAC frame to obtain a VXLAN frame. The VXLAN header of the VXLAN frame created by VTEP H includes VNI A, which identifies VXLAN segment A, to which virtual machine A1 is assigned. VTEP H of the VM host uses the destination MAC address of the MAC frame to determine the IP address of a destination VTEP capable of sending the MAC frame towards the destination computing device. In the present example, the MAC frame is being sent out of the network to a computing device reached through the Internet. Therefore, the destination VTEP for the MAC frame is VTEP E of the gateway network device, which provides connectivity to the Internet for the computing device if the network. Thus the destination IP address outer IP header of the VXLAN frame obtained by VTEP H is the IP address of VTEP E. The source IP address of the outer IP header of the VXLAN frame is the IP address of VTEP H. The source MAC address of the outer Ethernet header of the VXLAN frame is the MAC address of VTEP H. The destination MAC address in the outer Ethernet header is the next-hop MAC address. The next hop of MAC address is the MAC address corresponding to an interface leaf network device A. The VXLAN frame is then sent to leaf network device A.

Leaf network device A receives the VXLAN frame, examines the destination IP address in the outer IP header of the VXLAN frame, which is the IP address of VTEP E of the gateway computing device. This IP address is used to look up a route for the VXLAN frame in a routing table of leaf network device A, as well as to determine a next-hop MAC address. The determined next-hop MAC address is the MAC address corresponding to an interface of spine network device A. Leaf network device A then sends the VXLAN frame to spine network device A.

Spine network device A receives the VXLAN frame and determines that a routing function is necessary. Therefore, spine network device A examines the VXLAN frame and determines the destination IP address in the outer IP header, which is the IP address VTEP E of the gateway network device. The destination IP address is used, along with a routing table, to obtain a next-hop destination MAC address for the VXLAN frame, which is the MAC address corresponding to an interface of the gateway network device. Spine network device A then rewrites the VXLAN frame to include as a destination MAC address the obtained MAC address of the gateway network device. Spine network device A then sends the VXLAN frame from the appropriate interface to the gateway network device.

Once the VXLAN frame arrives at the gateway network device, the gateway device examines the VXLAN frame to determine the source VNI. The source VNI is determined to be VNI A. The gateway network device then uses VNI A to obtain the network policy implemented on the network device that is associated with VNI A. The network policy associated with VNI A indicates that any traffic originating from VNI A may not leave the network. VTEP E then decapsulates the VXLAN frame to obtain the original MAC frame sent from virtual machine A1. The gateway network device then examines the MAC frame to determine the destination IP address, which is used to determine the route for the MAC frame to reach the destination computing device. However, the destination computing device is determined by the gateway network device to exist outside the network. Therefore, according to the network policy, the gateway network device drops the MAC frame that originated from virtual machine A1.

Continuing with the example of FIG. 6, computing device B2 generates a MAC frame that encapsulates a packet that includes data to be transmitted to a destination computing device also connected to the Internet. The MAC frame includes the data payload, a source IP address (e.g., the IP address of computing device B2), and a destination IP address (e.g., the IP address of a destination computing device). The MAC frame also includes a source MAC address (e.g., the MAC address of computing device B2), and a destination MAC address. The destination MAC address may be, for example, the MAC address of the destination computing device, if known to computing device B2, or may be the MAC address of a network device that knows a route to the destination computing device (e.g., a default gateway). In this example, leaf network device B is the default gateway for computing device B2, and the destination MAC address of the MAC frame generated by computing device B2 is the MAC address of leaf network device B.

The MAC frame is then sent to leaf network device B, which includes VTEP L. Leaf network device B is configured to recognize MAC frames originating from or destined for computing device B2, because computing device B2 is assigned to VNI B. Leaf network device B uses the destination IP address of the MAC frame and information stored on leaf network device B to determine a MAC address of either the destination computing device, if known to leaf network device B, or of a network device knows a route to the destination computing device. Then the MAC frame is rewritten. The destination MAC address becomes the MAC address of the destination computing device or network device that knows a route to the destination computing device. In this example, because the destination computing device is outside the network, the leaf network device is not aware of the MAC address of the destination computing device, therefore the destination MAC address becomes the MAC address of the gateway network device. The source MAC address of the rewritten MAC frame is the MAC address of leaf network device B.

Next, VTEP L of leaf network device B encapsulates the rewritten MAC frame to obtain a VXLAN frame. The VXLAN header of the VXLAN frame includes VNI B, because computing device B2 is assigned to VNI B. VTEP L uses the destination MAC address of the MAC frame to determine the IP address of a destination VTEP capable of sending the MAC frame towards the destination computing device. In this example, the MAC frame is being sent out of the network to a computing device reached through the Internet. Therefore, the destination VTEP for the MAC frame is VTEP E of the gateway network device, which provides connectivity to the Internet for the computing device if the network. Thus the destination IP address in the outer IP header of the VXLAN frame obtained by VTEP L is the IP address of VTEP E. The source IP address of the outer header of the VXLAN frame is the IP address of VTEP L. The source MAC address of the outer Ethernet header of the VXLAN frame is the MAC address of leaf network device B. The destination MAC address in the outer Ethernet header is the next-hop MAC address. In this example, the next-hop MAC address is the MAC address corresponding to an interface of the spine network device B.

Spine network device B receives the VXLAN frame and determines that a routing function is necessary. Therefore, spine network device B examines the VXLAN frame and determines the destination IP address in the outer IP header, which is the IP address VTEP E of the gateway network device. The destination IP address is used, along with a routing table, to obtain a next-hop destination MAC address for the VXLAN frame, which is the MAC address corresponding to an interface of the gateway network device. Spine network device B then rewrites the VXLAN frame to include as a destination MAC address the obtained MAC address of the gateway network device. Spine network device B then sends the VXLAN frame from the appropriate interface to the gateway network device.

Once the VXLAN frame arrives at the gateway network device, the gateway device examines the VXLAN frame to determine the source VNI. The source VNI is determined to be VNI B. The gateway network device then uses VNI B to obtain a network policy configured on the network device that is associated with VNI B. The network policy associated with VNI B indicates that traffic originating from VNI B, as with any traffic originating from any VNI other than VNI A, is allowed leave the network. VTEP E then decapsulates the VXLAN frame to obtain the rewritten MAC frame sent from leaf network device B2.

The gateway network device then examines the MAC frame to determine the destination IP address, which is used to determine the route for the MAC frame to reach the destination computing device. The gateway network device finds a route to the destination computing device in a routing table, and obtains the next-hop MAC address. Per the network policy, network traffic originating from a computing device assigned to VNI B is allowed to pass and leave the network. Therefore, the gateway network device then rewrites the MAC frame to include the MAC address of the gateway network device as the source MAC address and the next-hop MAC address as the destination MAC address of the MAC frame. The new rewritten MAC frame is then sent out of an appropriate interface of the gateway network device to continue the journey towards the destination computing device.

In this example, changes made specific to virtual machine A1 or computing device B2 may not effect operation of the invention. Because the network policy is applied based on the source VNI, for example, changes made by a network administrator to the IP addresses or MAC addresses of virtual machine A1, computing device B2, or any other computing device of the network assigned to a configured VXLAN segment identified by a VNI, may not effect proper application of the network policy to MAC frames originating from computing devices assigned to the VNI. Furthermore, one or more network policies corresponding to a given VNI may be applied to some or all devices assigned to a VNI without the need to create a separate policy for each computing device assigned to the VNI. Additionally, the addition of, or removal of, computing devices from a VNI may not affect application of the network policy by the network device on which the network policy is implemented.

One of ordinary skill in the art and having the benefit of this disclosure will appreciate that although source VNI is used in the above example to apply a network policy to a MAC frame destined for a computing device outside the network or any VXLAN segment, source VNI could also be used to obtain network policies for application to network traffic that is sent from the source VNI to a different VXLAN network segment.

Figure 7:
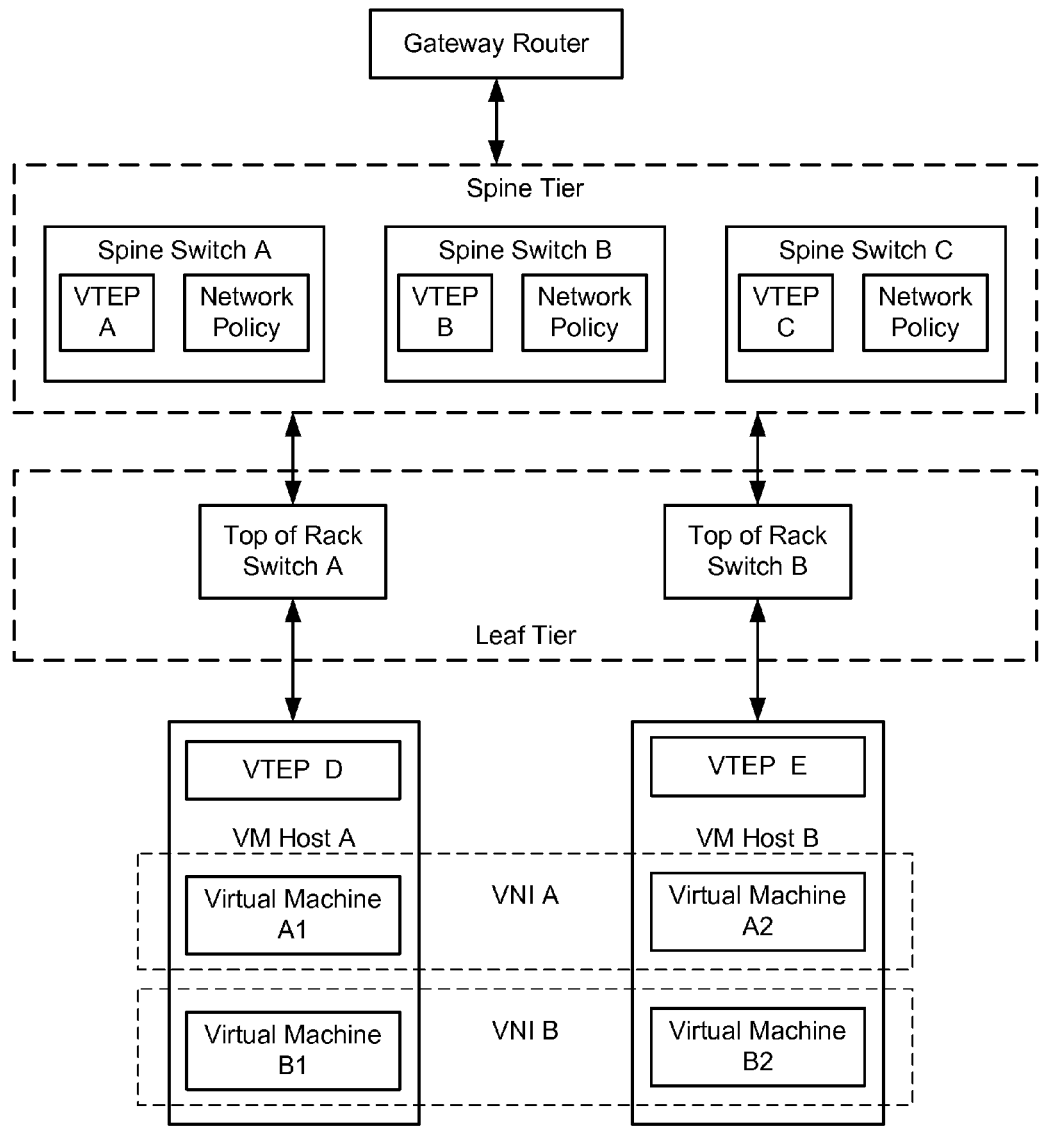
FIG. 7 shows an example of applying a network policy based on a destination VNI in accordance with one or more embodiments of the invention.

FIG. 7 shows an example in accordance with one or more embodiments of the invention. The example is not intended to limit the scope of the invention.

Referring to FIG. 7, consider a scenario in which a network includes a gateway router operatively connected to a spine tier. The gateway network device provides connectivity between the network of a company and the Internet. The spine tier includes spine switch A, spine switch B, and spine switch C. Spine switch A includes VTEP A and a copy of a network policy. The network policy includes a rule that any MAC frame destined for a computing device assigned to VNI B and that originates from outside the network segment identified by VNI B shall be dropped as well as a rule that any MAC frame destined for a computing device associated with VNI A that originated outside the company network is allowed to be sent to the destination computing device. Spine switch B includes VTEP B and a copy of the network policy. Spine switch C includes VTEP C and a copy of the network policy. Each spine switch includes information that relates an IP address to a MAC address for all computing devices connected to top of rack switches in the leaf tier. Each spine switch in the spine tier is operatively connected to each device in the leaf tier. The leaf tier includes top of rack switch A and top of rack switch B. Top of rack switch A is operatively connected to VM host A. VM host A hosts virtual machine A1 and virtual machine B1 and includes executing VTEP D. Top of rack switch B is operatively connected to VM host B. VM host B hosts virtual machine A2 and virtual machine B2 and includes executing VTEP E. Virtual machine A1 and virtual machine A2 are assigned to VNI A, which identifies VXLAN segment A. VXLAN segment A includes computing devices of employees of the human resources department of a company. Virtual machine B1 and virtual machine B2 are assigned to VNI B, which identifies VXLAN segment B. VXLAN segment B includes computing devices of an internal test network in the engineering research and development department of a company.

In the aforementioned scenario, a MAC frame arrives at the gateway router destined for virtual machine A2. The gateway router examines the destination IP address of the packet encapsulated in the received MAC frame to determine out of which interface to route the packet included in the MAC frame, as well as to determine the next-hop MAC address. The destination IP address is the IP address of virtual machine A2. The next-hop MAC address is the MAC address of an interface of one of the three spine switches. The gateway router selects the MAC address of spine switch A based on load balancing policies and rewrites the received MAC frame to include a MAC address of the gateway router as the source MAC address in the MAC frame and the MAC address of spine switch A as the destination MAC address of the rewritten MAC frame.

The rewritten MAC frame is then sent to spine switch A. Spine switch A examines the received MAC frame and uses the destination IP address to determine that the destination of the MAC frame is virtual machine A2. Spine switch A includes functionality to determine the VNI to which virtual machine A2 is assigned based on information included in the received MAC frame combined with information stored in the switch, and thus virtual machine A2 is determined to be assigned to VNI A. Spine switch A uses VNI A to obtain a network policy. The network policy that applies to VNI A is that traffic originating from outside the network is allowed to be transmitted to computing devices assigned to VNI A. Therefore, the network policy indicates that the MAC frame should be processed and sent towards virtual machine A2. Spine switch A rewrites the MAC frame to include the MAC address of virtual machine A2 as the destination MAC address of the rewritten MAC frame. VTEP A of spine switch A then encapsulates the rewritten MAC frame in a VXLAN frame. The VXLAN frame includes VNI A in the VXLAN header. The outer IP header includes the IP address of VTEP A as the source IP address and the IP address of VTEP E as the destination IP address. The outer Ethernet header of the VXLAN frame includes a MAC address of spine switch A as the source MAC address and the MAC address of top of rack switch B as the destination MAC address.

Continuing the example of FIG. 7, another MAC frame arrives at the gateway router. The MAC frame is destined for virtual machine B2. The gateway router examines the destination IP address of the packet encapsulated in the received MAC frame to determine out of which interface to route the packet, as well as to determine the next-hop MAC address. The destination IP address of the MAC frame is an IP address of virtual machine B2. The next-hop MAC address is the MAC address of an interface of one of the three spine switches. The gateway router selects the MAC address of spine switch C based on load balancing policies and rewrites the received MAC frame to include a MAC address of the gateway router as the source MAC address in the MAC frame and the MAC address of spine switch C as the destination MAC address of the rewritten MAC frame.

The rewritten MAC frame is then sent to spine switch C. Spine switch C examines the received MAC frame and uses the destination IP address to determine that the destination of the MAC frame is virtual machine B2.

Spine switch C includes functionality to determine the VNI to which virtual machine B2 is assigned based on information included in the received MAC frame combined with information stored with spine switch C, and thus virtual machine A2 is determined to be assigned to VNI B. Spine switch C uses VNI B to obtain a network policy. The only network policy that applies to VNI B present on spine switch C is that traffic originating from outside the network segment identified by VNI B should be denied from being transmitted to computing devices assigned to VNI B. Therefore, the network policy indicates that the MAC frame should dropped. Thus the MAC frame is not transmitted towards virtual machine B2.

In this example, changes made specific to virtual machine A2 or computing device B2 may not effect operation of the invention. Because the network policy is applied based on the destination VNI, for example, changes made by a network administrator to the IP addresses or MAC addresses of virtual machine A2, computing device B2, or any other computing device of the network assigned to a configured VXLAN segment identified by a VNI, may not effect proper application of the network policy to MAC frames destined for computing devices assigned to the VNI. Furthermore, one or more network policies corresponding to a given destination VNI may be applied to some or all devices assigned to the VNI without the need to create a separate policy for each computing device assigned to the VNI. Additionally, the addition of, or removal of, computing devices from a VNI may not affect application of the network policy by the network device on which the network policy is implemented.

One of ordinary skill in the art and having the benefit of this disclosure will appreciate that although destination VNI is used in the above example to apply a network policy to a MAC frame originating from a computing device outside the network or any VXLAN segment, destination VNI could also be used to obtain network policies for application to network traffic that is sent from a different VXLAN network segment to the VNI identified as the destination VNI.

While in this example, there were three spine switches that share a common network policy, one skilled in the art and having the benefit of this disclosure will appreciate that there may be a network policy on fewer than all network devices of a spine tier. For example, there may be a network policy on only one spine network to which all incoming network traffic destined for computing devices assigned to any VNI is routed. As another example, each spine network device may include one or more network policies specific to one or more VNIs, with the network policies distributed according to the requirements of the network and with MAC frames destined for a computing device of a given VNI routed to the spine network device that includes the one or more network policies associated with that VNI.

Figure 8:
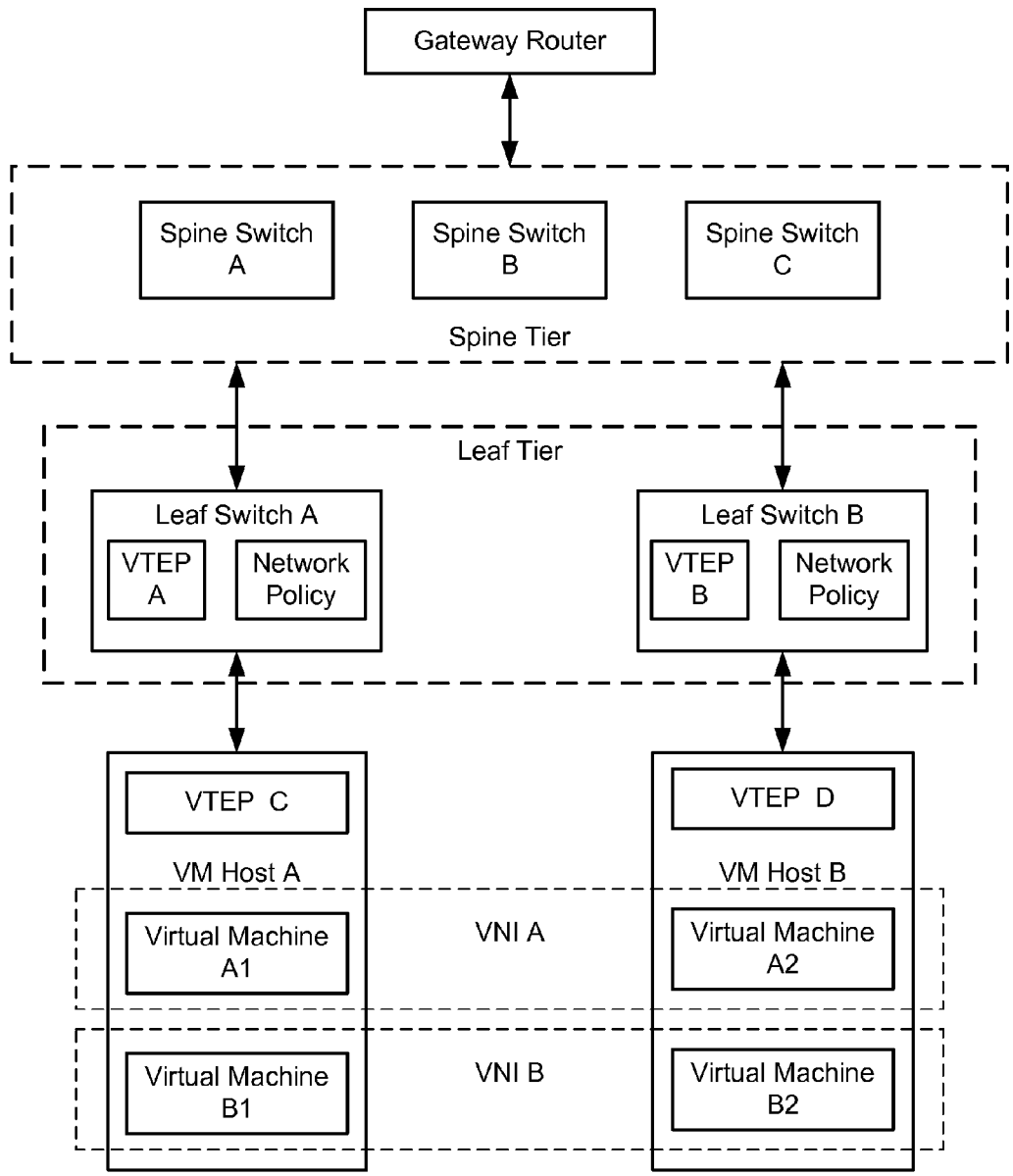
FIG. 8 shows an example of applying a network policy based on a source VNI and a destination VNI in accordance with one or more embodiments of the invention.

FIG. 8 shows an example in accordance with one or more embodiments of the invention. The example is not intended to limit the scope of the invention.

Referring to FIG. 8, consider a scenario in which a network includes a gateway router operatively connected to a spine tier. The gateway network device provides connectivity between the network of a company and the Internet. The spine tier includes spine switch A, spine switch B, and spine switch C. Each spine network device is an L3 switch capable of using IP addresses and/or MAC addresses to process MAC frames and/or VXLAN frames. Each spine network device is operatively connected to leaf switch A and leaf switch B. Leaf switch A includes one or more configured network policies associated with one or more VNIs and also includes VTEP A. Leaf switch B includes one or more configured network policies associated with one or more VNIs and also includes VTEP B. Leaf switch A is operatively connected to VM host A, which hosts virtual machine A1 and virtual machine B1, and which includes VTEP C. Leaf switch B is operatively connected to VM host B, which hosts virtual machine A2 and virtual machine B2, and which includes VTEP D. Virtual machine A1 of VM host A and virtual machine A2 of VM host B are assigned to VNI A, which identifies VXLAN segment A. Virtual machine B1 of VM host A and virtual machine B2 of VM host B are assigned to VNI B, which identifies VXLAN segment B. VNI A includes computing devices of employees in the engineering department of the company. VNI B includes computing devices of in the advertising department of the same company. Company policy requires that, subject to several exceptions, computing devices of employees in the engineering department and computing devices of employees in the advertising department are not to communicate via the company network. This company policy is implemented by the network administrators of the company, who create network policies to be applied by the leaf switches of the company's network.

In the aforementioned scenario, virtual machine A1 of VM host A generates a MAC frame that includes data to be transmitted to destination computing device virtual machine B2, a source IP address and source MAC address corresponding to the IP address and MAC address of virtual machine A1, and a destination IP address and a destination MAC address corresponding to the IP address and MAC address of virtual machine B2.

The MAC frame is sent to VTEP C, which encapsulates the MAC frame to obtain a VXLAN frame. The VXLAN header of the VXLAN frame written by VTEP C includes VNI A, which identifies VXLAN segment A, to which virtual machine A1 is assigned. VTEP C of VM host A uses the destination MAC address of the MAC frame to attempt to determine the IP address of a destination VTEP capable of sending the MAC frame towards the destination computing device. In this example, the MAC frame is being sent out to virtual machine B2, which is assigned to VNI B and thus VTEP C is unable to resolve the VTEP to which virtual machine B2 is operatively connected. Therefore VTEP C writes the IP address of VTEP A of leaf switch A, the default gateway of VTEP C, as the destination IP address and the IP address of VTEP C as the source IP address in the outer IP header. The source MAC address of the outer Ethernet header of the VXLAN frame is the MAC address of VM host A. The destination MAC address in the outer Ethernet header is the next-hop MAC address. The next hop of MAC address is the MAC address corresponding to an interface leaf network switch A to which VM host A is operatively connected. The VXLAN frame is then sent to leaf switch A.

Leaf switch A, upon receipt of the VXLAN frame, examines the VXLAN header to determine that the source VNI of the original MAC frame is a computing device (i.e., virtual machine A1) that is assigned to VNI A. Leaf switch A then examines the VXLAN frame and uses information included therein (e.g., information from the inner header of the MAC frame, information from the outer header of the VXLAN frame, or a combination thereof) along with information stored on leaf switch A to determine that the destination VNI of the VXLAN frame is VNI B.

Leaf switch A then uses VNI A as the source VNI and VNI B as the destination VNI to obtain a network policy that applies to VXLAN frames that are to be routed from VNI A (i.e., source VNI) to VNI B (i.e., destination VNI). In the instant example, the network policy obtained includes a rule that no MAC frames are to be transmitted from a computing device assigned source VNI A to computing device assigned to destination VNI B. Therefore, the VXLAN frame is dropped in accordance with the network policy obtained using the source VNI and the destination VNI.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for applying network policies in a virtual extensible local area network (VXLAN) environment implemented in a network, comprising:
   receiving, at a network device of the network, a VXLAN frame,
      wherein the VXLAN frame originates from a source computing device associated with a source virtual network identifier (VNI),
      wherein the VXLAN frame comprises a media access control (MAC) address associated with a destination computing device of the network, and
      wherein the network device comprises a first network policy;
   examining the VXLAN frame to determine the MAC address of the destination computing device;
   determining, based on the MAC address of the destination computing device, a destination VNI of the VXLAN frame;
   obtaining, based on the source VNI and the destination VNI, the first network policy of the network device; and
   processing the VXLAN frame by applying the first network policy.

2. The method of claim 1, further comprising:
   receiving, at the network device, a second VXLAN frame, wherein the second VXLAN frame comprises a second source (VNI) and a second MAC address associated with a second destination computing device of the network and wherein the network device further comprises a second network policy;
   examining the second VXLAN frame to determine the second source VNI;
   determining, based on the second MAC address of the second destination computing device, a second destination VNI of the second VXLAN frame;
   obtaining, based on the second source VNI, the second network policy of the network device; and
   processing the second VXLAN frame by applying the second network policy.

3. The method of claim 2, wherein network device further comprises a virtual tunnel end-point (VTEP), wherein the source VNI and the second destination VNI are not the same VNI, and wherein the method further comprises:
   decapsulating, by the VTEP, the second VXLAN frame to obtain a MAC frame;
   performing, by the network device, a routing function to obtain a rewritten MAC frame; and
   encapsulating, by the VTEP, the rewritten MAC frame, wherein the rewritten MAC frame comprises the second destination VNI.

4. The method of claim 1, wherein the network device further comprises a virtual tunnel end-point (VTEP) and wherein examining the VXLAN frame to determine the destination MAC address of the destination computing device comprises:
   decapsulating the VXLAN frame to obtain a MAC frame; and
   examining the MAC frame to obtain the destination MAC address.

5. The method of claim 1, wherein the first network policy is one selected from a group consisting of an access control list and a quality of service policy.

6. The method of claim 1, wherein the destination computing device is one selected from a group consisting of a server, a personal computing device, and a virtual machine.

7. The method of claim 1, further comprising:
   receiving, at the network device, a second VXLAN frame, wherein the second VXLAN frame comprises a second source VNI and a second MAC address associated with a second destination computing device of the network and wherein the network device further comprises a second network policy;
   examining the second VXLAN frame to determine the second source VNI;
   determining, based on the second MAC address of the second destination computing device, a second destination VNI of the second VXLAN frame;
   obtaining, based on the second destination VNI, the second network policy of the network device; and
   processing the second VXLAN frame by applying the second network policy.

8. The method of claim 1, wherein the first network policy is one selected from a group consisting of a firewall and a traffic shaping policy.

9. The method of claim 1, wherein the network device is one selected from a group consisting of a switch, a router, and a multi-layer switch.

10. The method of claim 1, wherein the network device is one selected from a group consisting of a leaf network device, a spine network device, and a gateway network device.

11. A system for applying network policies in a virtual extensible local area network (VXLAN) environment, the system comprising:
   a computing device configured to generate and receive media access control (MAC) frames and operatively connected to a network device; and
   the network device comprising a first network policy and a VXLAN tunnel end-point (VTEP) and configured to:
      receive, at the network device, a VXLAN frame, wherein the VXLAN frame originates from a source computing device associated with a source virtual network identifier (VNI), wherein the VXLAN frame comprises a MAC address associated with a destination computing device;
      examine the VXLAN frame to determine the MAC address of the destination computing device;
      determine, based on the MAC address of the destination computing device, a destination VNI of the VXLAN frame;
      obtain, based on the source VNI and the destination VNI, the first network policy of the network device; and
      process the VXLAN frame by applying the first network policy.

12. The system of claim 11, wherein the network device is further configured to:
   receive, at the network device, a second VXLAN frame, wherein the second VXLAN frame comprises a second source VNI and a second MAC address associated with a second destination computing device and wherein the network device further comprises a second network policy;

examine the second VXLAN frame to determine the second source VNI;

determine, based on the second MAC address of the second destination computing device, a second destination VNI of the second VXLAN frame;

obtain, based on the second source VNI, the second network policy of the network device; and process the second VXLAN frame by applying the second network policy.

13. The system of claim 12, wherein the source VNI and the second destination VNI are not the same VNI, and wherein the method further comprises:

decapsulating, by the VTEP, the second VXLAN frame to obtain a MAC frame;

performing, by the network device, a routing function to obtain a rewritten MAC frame; and encapsulating, by the VTEP, the rewritten MAC frame, wherein the rewritten MAC frame comprises the second destination VNI.

14. The system of claim 11, wherein the network device is one selected from a group consisting of a switch, a router, and a multi-layer switch.

15. The system of claim 11, wherein the network device is one selected from a group consisting of a leaf network device, a spine network device, and a gateway network device.

16. The system of claim 11, wherein the first network policy is one selected from a group consisting of a quality of service policy and an access control list.

17. The system of claim 11, wherein the first network policy is one selected from a group consisting of a firewall and a traffic shaping policy.

18. The system of claim 11, wherein the computing device is one selected from a group consisting of a server, a personal computing device, and a virtual machine.

19. The system of claim 11, wherein to examine the VXLAN frame to determine the destination MAC address of the destination computing device, the network device is further configured to:

decapsulate the VXLAN frame to obtain a MAC frame; and examine the MAC frame to obtain the destination MAC address.

20. The system of claim 11, wherein the network device is further configured to:

receive, at the network device, a second VXLAN frame, wherein the second VXLAN frame comprises a second source VNI and a second MAC address associated with a second destination computing device and wherein the network device further comprises a second network policy;

examine the second VXLAN frame to determine the second source VNI;

determine, based on the second MAC address of the second destination computing device, a second destination VNI of the second VXLAN frame;

obtain, based on the second destination VNI, the second network policy of the network device; and process the second VXLAN frame by applying the second network policy.

* * * * *